INVENTOR.
P.L.M. VAN BERKEL
BY Hugh A. Kirk
ATTY.

June 8, 1965 P. L. M. VAN BERKEL 3,188,614

APPARATUS FOR COMPENSATING FOR SKEWED DIGITAL INFORMATION UPON A MAGNETIC TAPE

Filed Feb. 8, 1961 3 Sheets-Sheet 2

INVENTOR.
P.L.M. VAN BERKEL.
BY
Hugh A. Kirk
ATTY.

INVENTOR.
P. L. M. VAN BERKEL.
BY Hugh A. Kirk
ATTY.

3,188,614

APPARATUS FOR COMPENSATING FOR SKEWED DIGITAL INFORMATION UPON A MAGNETIC TAPE

Petrus Ludovicus Maria van Berkel, Voorburg, Netherlands, assignor to de Staat der Nederlanden, ten deze Vertegenwoordigd door de Directeur-Generaal der Posterijen, Telegrafie en Telefonie, The Hague, Netherlands Filed Feb. 8, 1961, Ser. No. 87,934
Claims priority, application Netherlands, Feb. 19, 1960, 248,625
12 Claims. (Cl. 340—174.1)

The invention relates to a method and a device for reproducing information recorded in a digital form on a magnetic tape. This information is recorded in the form of differently magnetized areas lying in parallel tracks in the direction of the magnetic tape. The information bits of one signal lie in a direction perpendicular to this direction. The reproduction of each signal is effected by means of separate reading-heads and translators simultaneously reading each track.

Digital recording on a magnetic tape as well as reading from it have been described in Paul J. Weber's book entitled: "The Tape Recorder as an Instrumentation Device," published by the Ampex Corporation in 1958. With digital recording the values 1 and 0 of a bit in the binary system can be rendered by means of a recording head which, respectively, magnetizes an area in one direction, and either magnetizes an area in the opposite direction or does not magnetize an area.

For the correct reading of a signal it is necessary to consider simultaneously all the pulses corresponding to the bits of one signal which are simultaneously generated in the separate reading-heads past which the tape moves with its correspondingly separate tracks.

If, however the centre-line of the tape is not perpendicular to the line connecting the centres of the air-gaps of these reading-heads, that is, if the tape is oblique, a simultaneous consideration will be hampered and eventually there will arise errors in the reading of the signals, and these errors will occur sooner the greater the storage density of the bits on the tape. The fact is that the pulses generated in the reading-heads are prolonged in so-called translators. The less the storage density, the longer can be the prolongation and the easier the synchronous scanning of these pulses will be.

In order that tapes of a greater storage density than usual can be tolerated, is a purpose of the method according to the invention. This is accomplished by the simultaneous scanning of the translator pulses belonging to one signal with a synchronizing pulse which is derived from the trailing edge of the first of these translator pulses, and which terminate all of the translator pulses after they all have been somewhat delayed.

The device according to the invention is so arranged that the translator output terminals are connected on one hand to delay circuits and on the other hand via differentiating circuits to a circuit for separating pulses of different polarities, at the output terminal, of which appear the pulses derived from the trailing edges of the translator pulses. These trailing edges derived pulses are connected to a circuit having more than one state, which is put in another state by the first trailing edge derived pulse of the translator pulses belonging to one signal and which circuit is restored to normal after the appearance of the last of these pulses within the translator pulse duration. An output terminal of the two state circuit is connected to a pulse shaper which responds to the first change of state, and which has its output terminal connected in turn to a gating circuit to which the output terminals of the above-mentioned delay circuits are also connected.

The above mentioned and other features and objects of this invention and the manner of attaining them will become more apparent and the invention itself will be understood best by reference to the following description of an embodiment of the invention taken in conjunction with the accompanying drawings, wherein.

Figure 3:
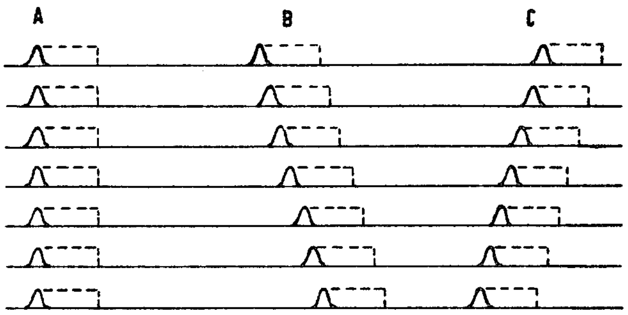
Figure 4:
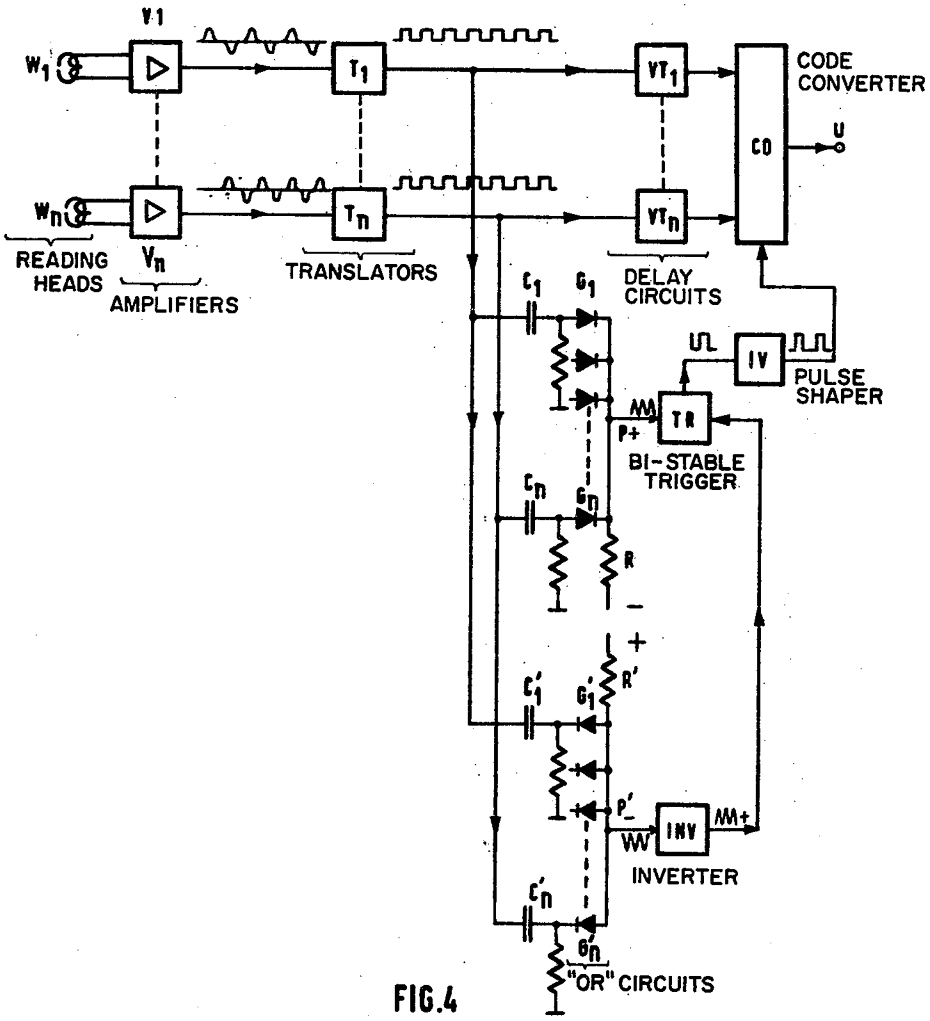

FIG. 3 shows wave-form diagrams of pulses appearing at the output terminals of a set of parallel reading-heads and in dotted lines the pulses resulting from the translators connected to them, as a result of perpendicular and opposite oblique reading of seven parallel tracks on a magnetic tape; and FIG. 4 is a schematic wiring diagram of an embodiment of a device according to the invention for compensating for oblique running of a magnetic tape having a plurality of parallel tracks simultaneously read and possible of great storage density.

The digital recording of information on a magnetic tape may be effected in different ways.

Figure 1:
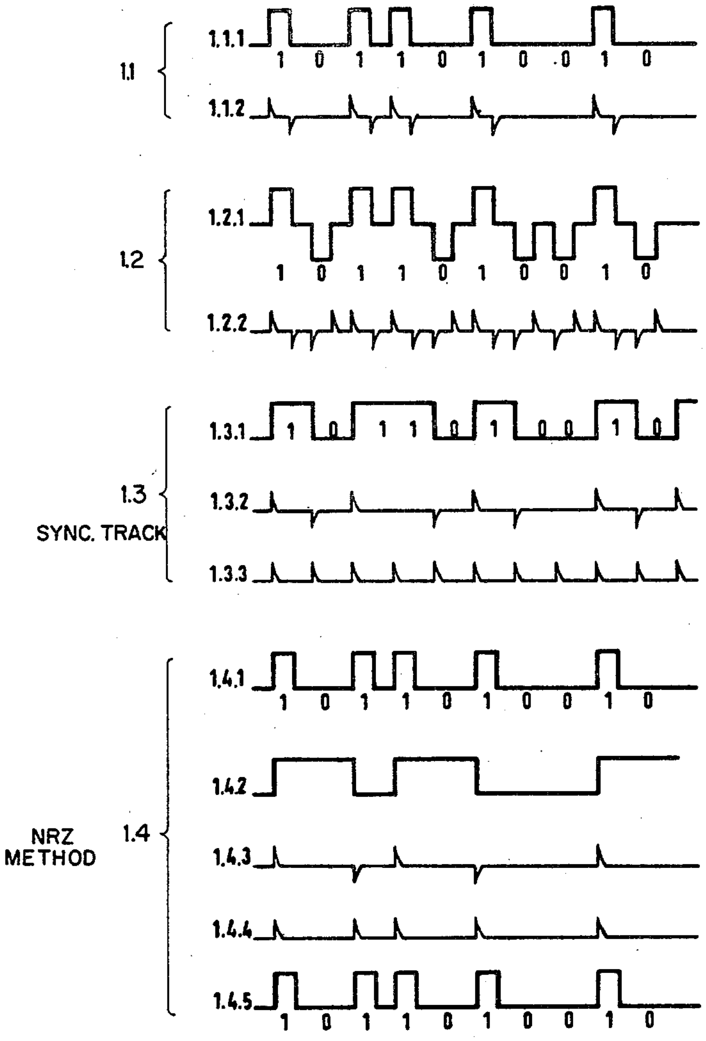
FIG. 1 shows some wave-form diagrams of pulse shapes occurring from four different methods of digital recording and reading of information.

In FIG. 1 line 1.1.1 shows a waveform which is recorded by representing the 1-bits by magnetized areas and the 0-bits by unmagnetized areas. Waveform 1.1.2 shows the output pulse shape of the reading-head from reading the wave form 1.1.1. Such a reading-head only reacts to a change of magnetization from reading the wave form 1.1.1. Waveform 1.2.1 shows a surer or safer form of recording the information of waveform 1.1.1, in which both the 1-bits and the 0-bits are represented by magnetized areas, notably of opposite directions of magnetization. Waveform 1.2.2 shows the output pulse shape of the readinghead from reading waveform 1.2.1. Waveform 1.3.1 shows a form of recording the information of waveform 1.1.1 or 1.2.1 in which, in order to achieve a larger storage density, adjacent magnetized areas as occurring in the case of waveform of 1.1.1 or 1.2.1 have been put so close together that they merge into each other. Thus waveform 1.3.2 shows the output pulse shape of the reading head for the waveform 1.3.1. Two or more consecutive bits of the same kind cannot be distinguished directly in this case, because the reading-head perceives no changes of magnetization. It is necessary therefore that the tape possess a synchronization track in addition to the information tracks. Waveform 1.3.3 shows the output pulses of the reading-head of such a synchronization track.

The fact that in this case the absence of an output pulse in the case waveform 1.3.2 is now characteristic of the presence of a 1-bit, and at another time characteristic of a 0-bit, has sometimes been felt as a drawback. That is why the method illustrated in waveforms 1.4 is more usual. In this method every 1-bit is represented by a transition from one magnetized state to the other, whereas a 0-bit is represented by a continuation of the just previously magnetized condition. On line 1.4.1 the waveform of line 1.1.1 to be recorded is repeated. When this waveform 1.1.1 or 1.4.1 is applied to a binary dividing circuit, the waveform 1.4.2 is obtained, which is recorded. Waveform 1.4.3 shows the output pulse shape of the reading-head from reading waveform 1.4.2. The waveform 1.4.4 is derived from that of waveform 1.4.3 by changing the negative pulses into positive ones. Finally waveform 1.4.5 is obtained which shows the original waveform 1.1.1 again, as it can be derived from reshaping the pulses of waveform 1.4.4. The last mentioned recording method of waveform 1.4, as distinct from the others, is often called the NRZ method (non-return-to-zero).

The conversion of the signal of waveform 1.4.3 into that of waveform 1.4.5 is effected by means of a translator. If with the last mentioned recording method the code is taken such that there is always a 1-bit in at least one of the tracks, a separate synchronizing track can be dispensed with. In that case the synchronizing pulse can be derived from each whole signal from the outputs of all of the reading-heads by means of an "or" circuit.

The reproducing method according to the invention can be applied to all the recording methods described. As has been mentioned in the preamble already, this method has been devised in order that greater storage densities can be tolerated in recording. Now the recording method according to waveform 1.4 is already the most suitable in itself to achieve greater storage densities because in similar cases the bandwidth required at the recording end as well as at the reading end is the narrowest. If the same bandwidth is used as with the other methods, the storage density can be greater, and if it is desired to tolerate the greatest possible storage density, the recording must be effected by the method of waveforms 1.4 in FIG. 1 and the method according to the invention be applied in the reading process.

The storage density that can be obtained with the recording method according to the method of waveforms 1.4 and the prior known reading methods is of the order of 300 bits/inch for tape ½ inch wide, and 150 bits/inch for tape 1 inch wide, the storage density being limited by factors of a mechanical nature, viz.

(1) The width of the air-gap of the recording-head, which is approximately 0.00025″ (6.25$\mu$);

(2) The displacement of the air-gaps of the heads with respect to each other; it can be reduced to approximately 0.0001 (2.5$\mu$);

(3) The deviation of the position of the air-gap from the vertical; it can be reduced to approximately 1 minute of arc; and (4) The lack of straightness of the magnetic tape.

Figure 2:
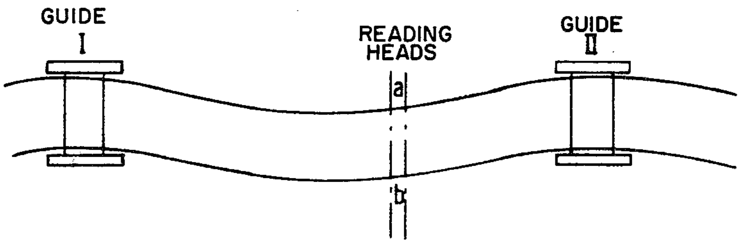
FIG. 2 shows diagrammatically an obliquely running magnetic tape between two spaced tape guides.

If only factor (1) were involved, then the storage density could be larger than the above-mentioned 300 bits/inch, since the width of the air-gap is only ¼000 inch. Moreover the deviation mentioned under factor (2) is constant and the displacements can be corrected by inserting small adjustable circuits. The deviation mentioned under factor (3) is constant also and can be eliminated by a careful adjustment. Thus there remains only the deviation mentioned under factor (4) which is the most important and the hardest to overcome. True, a width specification can be given for the tape, as e.g.

$$0.496'' \pm \frac{0.000''}{0.004''}$$

which is usual for tape ½ inch wide, but the tape may satisfy this specification and yet exhibit an inadmissible deviation from straightness. Such a lack of straightness is shown, much exaggerated, in FIG. 2. The tape is shown to be guided at two points by guides I and II. If the air-gaps of the reading-heads are placed within area *ab*, these heads will not scan the bits of one signal occurring in the various channels simultaneously, as the recording and reading hardly ever will occur in exactly the same way. The best place for locating the recording and reading heads would be near the guides I and/or II, but this is not feasible due to the size of the heads. With the various types and makes, the places for locating the heads are not the same, and moreover they are not the same for the recording and the reading-heads. Due to its freeness and/or obliqueness the tape will once lie in a downward band, then next in an upward band between the guides I and II. The result will be that sometimes the upper and sometimes the lower reading-head deliver a pulse first, but as there need not always occur a pulse in each track, any head may in fact deliver a pulse first or last. Accordingly, a correct reading will be fundamentally impossible, if the obliqueness is so large that the pulse appearing at the output terminal of the translator for one of the channels has already finished before the pulse for one of the other channels begins. The wider the tape, the more oblique it proves to be in practice and the more hindrance will be experienced from this phenomenon of obliqueness. That is why, as has been described, the storage density can be larger with ½ inch width tape than with 1 inch width tape.

FIG. 3 gives by way of example an oscillogram of the pulses appearing at the reading-heads of 7 tracks and of those appearing at the output terminals of the translators connected to them.

The latter pulses are drawn in dotted line. For the first signal, at A, the pulses appear simultaneously, for the second, at B, those of the higher channels appear before those of the lower channels, and for the third, at C, conversely.

In the cases of B and C it is not possible without further measures to check the validity of the bits of a signal.

The correct checking moment must be determined by a synchronizing pulse. With the usual storage densities and obliqueness of tape, the duration of the translator pulses can be taken so long, that if a synchronizing pulse appears at a moment half a pulse duration after the leading edge of one of the translator pulses, all the translator pulses will be present and properly read. If greater storage densities are wanted, however, which would entail a shorter translator pulse duration, the storage density for a certain obliqueness of the tape cannot be maximum in using this prior simple method with the appearance of the synchronizing pulse on a moment situated a certain duration after the leading edge. In such a case half the pulse duration would have to be shorter than the delay between the first and the last pulse, so that with the same obliqueness of the tape, the synchronizing pulse would appear before the leading edge of the last translator pulse.

In order that a synchronizing pulse appears aways on a moment that is adapted to the variations of the storage density caused by obliqueness, by which method this density can be (on the average) greater, the said pulse is derived from the trailing edge of the first occurring pulse, after which all the pulses are terminated with equal delays (see FIG. 3), so that they all, even the one that appeared first, are present when the synchronizing pulse appears.

FIG. 4 shows an embodiment, which has been thought of as applied to the case illustrated in waveforms 1.4 of FIG. 1. At the left of FIG. 4 the reading-heads $W_1$–$W_n$ for the *n* tracks of the magnetic tape have been pictured. They are connected to the respective amplifiers $V_1 \ldots V_n$, which are followed in their turn by translators $T_1 \ldots T_n$. The output terminals of these devices are connected on one hand to one of the delay circuits $VT_1 \ldots VT_n$ and on the other hand via capacitors $C_1 \ldots C_n$ and $C_1' \ldots C_n'$ to "or" circuits P consisting of rectifiers $G_1 \ldots G_n$ and a resistor R, and "or" circuit P′ consisting of rectifiers $G_1' \ldots G_n'$ and a resistor R′, respectively.

The output terminal of the "or" circuit P′ is connected to an invertor INV, the output terminal of which is connected to one input terminal of a bistable trigger TR. The other input terminal of this trigger TR is connected to the output terminal of the "or" circuit P. An output terminal of trigger TR is connected to a pulse shaper IV, the output terminal of which is connected, as well as the output terminals of delay circuits $VT_1 \ldots VT_n$, to a code convertor CO.

The pulses delivered by the reading-heads $W_1 \ldots W_n$ when the magnetic tape passes, are applied in the usual manner, after having been amplified by amplifiers $V_1 \ldots V_n$ to translators $T_1 \ldots T_n$. By a correct choice of RC-times and limiting levels these translators are so arranged that with the greatest storage density to be read, the mark/space or pulse-bit/space-bit ratio of the signal elements at the output terminals is not greater than one. Thus it is not possible that a pulse belonging to the next signal starts before a pulse belonging to the preceding signal has finished. Via the capacitors $C_1 \ldots C_n$ which are supplied via resistors with a fixed potential, the output terminals of the translators $T_1 \ldots T_n$ are connected to the rectifiers $G_1 \ldots G_n$ of the "or" circuit P. The common point P of these rectifiers $G_1 \ldots G_n$ is supplied via resistor R with a negative potential.

So the output potentials of the translators $T_1 \ldots T_n$ are differentiated by means of the capacitors $C_1 \ldots C_n$, and the positive pulses are passed to a input terminal of trigger TR. These positive pulses correspond to the leading edges of the output pulses of the translators $T_1 \ldots T_n$.

In like manner the output terminals of the translators $T_1 \ldots T_n$ are connected via capacitors $C_1' \ldots C_n'$, each of which is supplied via a resistor with a fixed potential, to the rectifiers $G_1' \ldots G_n'$ of the "or" circuit P'. The common point P' of these rectifiers $G_1' \ldots G_n'$ is supplied via resistor R' with a positive potential. Thus the "or" circuit P' passes the negative pulses to an inverter INV. These negative pulses correspond to the trailing edges of the output pulses of the translators. They are inverted in the inverter to positive pulses and then applied to the second input terminal of trigger TR. When a signal is read, the trigger TR changes over at the first pulse corresponding to a leading edge and restores to normal at the first pulse corresponding to a trailing edge. In this manner the first-appearing translator pulse is separated from the other pulses, irrespective of the translator, from which it originates.

The trigger TR delivers a potential step when return-pulse from the shaper IV to the code converter or gating into the desired synchronizing pulse by pulse shaper IV. The output potentials of the translators are further applied ot delay circuits $VT_1 \ldots VT_n$ each of which contains e.g. a small transistor memory. In this device the pulses are prolonged corresponding to the pulse duration of the pulse shaper IV. The potentials thus obtained are applied in the presence of the synchronizing pulse from the shaper IV to the code converter or gating circuit CO in which it is tester whether the bits read constitute a valid code. If they do, they are supplied to the output terminal U for further processing.

In this manner it has proved possible to tolerate a storage density of 600 bits/inch with a magnetic tape ½ inch wide of the poorest quality, so twice the usual storage density can be obtained by the method and apparatus of this invention.

While I have illustrated and described what I regard to be the preferred embodiment of my invention, nevertheless it will be understood that such is merely exemplary and that numerous modifications and rearrangements may be made therein without departing from the essence of the invention, I claim:

1. A device for reproducing digital information recorded on a plurality of parallel tracks on a strip, comprising:
   (a) separate means for reading information bits from each track simultaneously and transversely of said strip as said strip moves relative to all of said reading means,
   (b) translating means connected to each reading means for translating said read bits of information into pulses,
   (c) delaying means connected to each translating means for delaying each pulse of said translated information an equal amount,
   (d) differentiating means connected to each of said translating means for detecting the trailing edge of each translated pulse,
   (e) trigger means connected to said differentiating means responsive to the first occurring trailing edge of said simultaneously read and translated pulses,
   (f) pulse shaping means connected to said trigger means for producing a synchronizing pulse corresponding with said first occurring trailing edge of said simultaneously read and translated pulses, and
   (g) gating means connected to each of said delay means and connected to said pulse shaping means to pass said delayed information under the control of said synchronizing pulse.

2. A device according to claim 1 wherein said strip comprises a magnetic tape.

3. A device according to claim 1 wherein each simultaneously and transversely read group of information bits comprises a signal of a corresponding plurality of elements.

4. A device according to claim 1 wherein said translating means includes means for forming pulse-bit/space-bit ratio of at most one to one.

5. A device according to claim 1 wherein said delaying means also includes means for storing said translated information.

6. A device according to claim 1 wherein said differentiating means includes means for also detecting the leading edge of each translated pulse, and wherein said trigger means is responsive to the leading edge of the first occurring translated pulse of said simultaneously read and translated pulses.

7. A device acocrding to claim 6 wherein said trigger means is bistable and is triggered into one position by the leading edge of said first occurring translated pulse and is triggered into the other position by said first occurring trailing edge of said simultaneously read and translated pulses.

8. A device according to claim 6 wherein said differentiating means includes separate rectifier means for separating differentiated pulses of different polarity.

9. A device acocrding to claim 8 including an inverter for inverting all the pulses of one type of polarity so that the resulting pulses from said differentiating means will all possess the same polarity before being connected to said trigger means.

10. A device for reproducing digital information recorded on a plurality of parallel tracks on a magnetic tape, comprising:
   (a) separate means for reading information bits from each track simultaneously and transversely of said tape for each signal of a plurality of bits corresponding to a given number of said tracks as said tape moves relative to all said reading means,
   (b) translating means connected to each reading means for translating said read bits of information into pulses,
   (c) means connected to each translating means for delaying and storing each of said translated information pulses equal amounts, gating means connected to said delaying and storing means for passing said delayed and stored information pulses,
   (e) differentiating means also connected to each of said translating means for detecting the leading edges and the trailing edges of each translated pulse,
   (f) two groups of rectifier means connected to said differentiating means for separting the differentiated pulses of different polarities,
   (g) bistable trigger means connected to said rectifier means and responsive to the leading edge of the first occurring translated pulse and the first occurring trailing edge of a translated pulse in each signal, and a pulse shaping means connected to said trigger means and said gating means for producing a synchronizing pulse corresponding with said first occurring trailing edge of said translated pulses for controlling said gating means.

11. A device according to claim 10 wherein said gating means comprises a code converter for said signal.

12. A device according to claim 10 including inverter means connected to one group of said rectifier means for inverting the polarity of the differentiated trailing edges of said translated information pulses before passing them to said trigger means.

References Cited by the Examiner

UNITED STATES PATENTS

| | | | |
|---|---|---|---|
| 2,700,155 | 1/55 | Clayden | 340—174.1 |
| 2,804,605 | 8/57 | De Turk | 340—174.1 |
| 2,864,077 | 12/58 | De Turk | 340—174.1 |
| 2,886,802 | 5/59 | Henning et al. | 340—174.1 |
| 2,907,989 | 10/59 | Guerber | 340—174.1 |
| 2,936,444 | 5/60 | Hieken | 340—174.1 |
| 2,972,735 | 2/61 | Fuller et al. | 340—174.1 |
| 2,972,736 | 2/61 | Hersh | 340—174.1 |
| 3,016,523 | 1/62 | Sharp | 340—174.1 |
| 3,064,242 | 11/62 | Hill et al. | 340—174.1 |

IRVING L. SRAGOW, *Primary Examiner.*